UNITED STATES PATENT OFFICE.

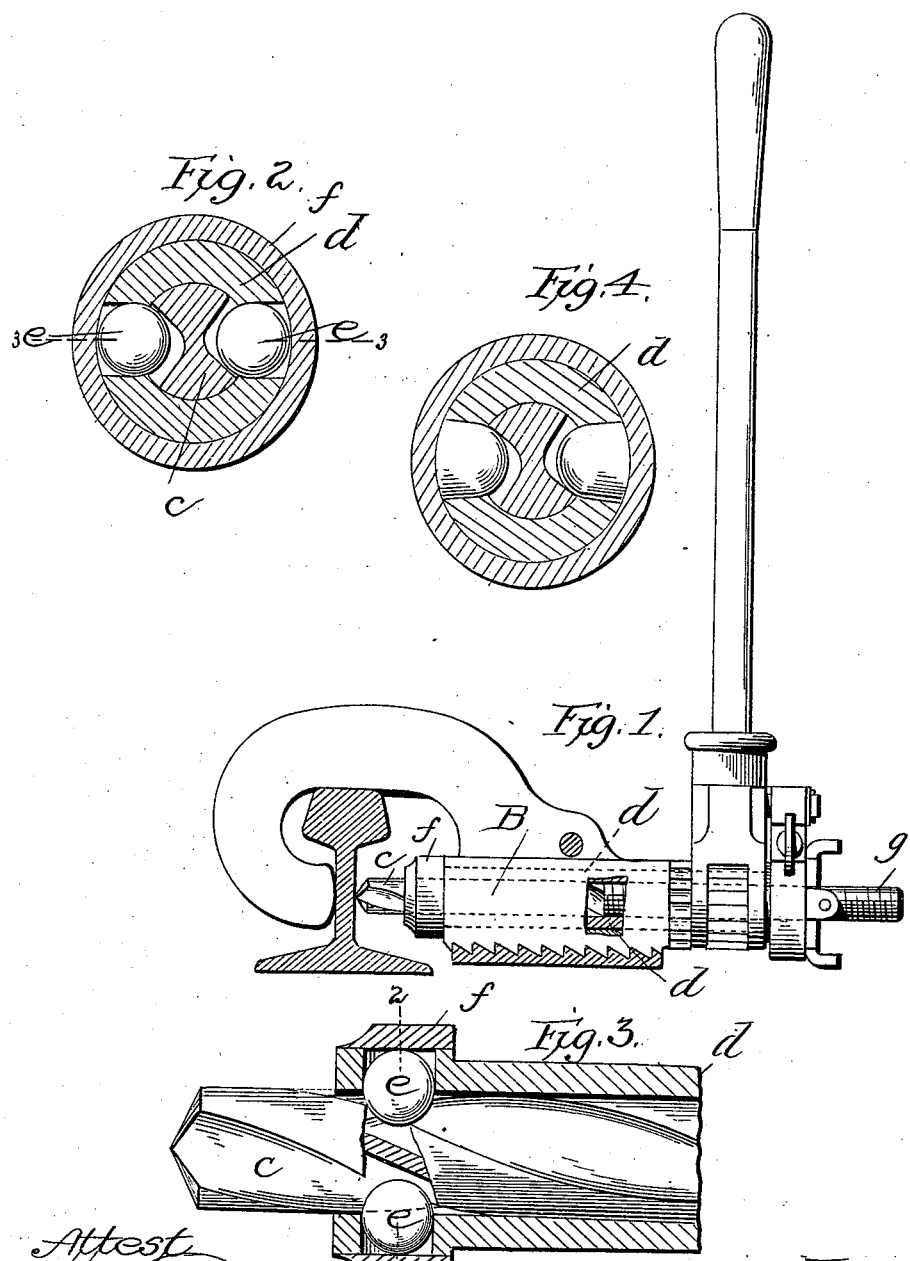

LOUIS J. CRECELIUS, OF ST. LOUIS, MISSOURI, ASSIGNOR TO ANDREW WARREN, OF SAME PLACE.

TRACK-DRILL.

SPECIFICATION forming part of Letters Patent No. 549,187, dated November 5, 1895.

Application filed March 4, 1895. Serial No. 540,472. (No model.)

*To all whom it may concern:*

Be it known that I, LOUIS J. CRECELIUS, a citizen of the United States, residing at St. Louis, in the State of Missouri, have invented certain new and useful Improvements in Track-Drills, of which the following is a specification, reference being had therein to the accompanying drawings.

My invention is an improvement in track-drills; and my improvement is designed to simplify the construction and to lessen the friction of operation, and thus to render the drill more effective with the same amount of power.

My invention is illustrated in the accompanying drawings, in which—

Figure 1 represents the complete drill in position as when it is applied to a track. Fig. 2 shows a cross-section on line 2 2 of Fig. 3; and Fig. 3 represents a longitudinal section of the sleeve with the drill in place, the section being made on line 3 3 of Fig. 2. Fig. 4 is a cross-section similar to Fig. 2, but represents a modified form.

As my invention relates more particularly to the construction of the drill itself and in connection therewith the devices for holding the drill, I confine myself in the following description to these particular parts. The mechanisms for feeding the drill may be such as those shown in Letters Patent of the United States No. 514,544, granted February 13, 1894. The block B is mounted in the frame in the same manner as shown in said Letters Patent, having interlocking parts to permit adjustment. In this block the hollow drill-spindle $d$ turns by means of mechanism such as described in said patent or by means of any other suitable mechanism. The front end of the spindle has a smooth cylindrical bore to receive the drill $c$. On opposite sides are recesses which contain the locking or holding devices $e$. As shown in Figs. 2 and 3, these consist of round balls of any suitable material. The cavities for them are made by drilling holes radially from the periphery of the spindle, which, as shown in Fig. 3, is preferably made larger at the end. The holes open into the bore of the spindle, but are preferably smaller on the inside, as shown in Fig. 2, in order that they may retain the balls in place when the drill is removed. They are held upon the outside by means of a band $f$, which surrounds the end of the spindle, the construction being such, when the balls are used, that the balls have free play.

The drill itself is in some respects of special construction. It has the ordinary twist and fluting, as shown in Figs. 2 and 3; but these flutes extend from end to end, and the drill is made without shank or taper. When the projections are in place and project into the cavity of the spindle which receives the drill, the drill may be inserted from the outer end by first placing the drills so that the flutes pass over the projections or balls and then by turning the drill and pushing it into place. When the spindle is turned in operating the drill, the balls or projections which enter the flutes serve to turn the drill at the same time. The drill is fed forward, as shown in Fig. 1, by means of the screw $g$, which is turned by mechanism operated by the lever in the manner described in said patent.

While I prefer to use the balls for the reason that I thereby avoid friction and can make larger cuts with less power, and thus save time and labor, I may make projections, as shown in Fig. 4, or projections fixed in the spindle in any convenient way.

The drill itself is simple in form, consisting only of a cylindrical piece of steel with a spiral fluting from end to end and requires no special shank. It is firmly held well forward to the end, whatever may be the length of the drill, and holds also equally at any point as the drill advances.

While I have shown projections on each side and in duplicate, I do not limit myself to this number, although it is best; but I may use one projection instead of two or more.

I claim—

1. In combination with the spindle having recesses therein, the fluked drill, and the locking pieces loosely seated in the recesses, and engaging the flukes of the drill, said recesses having contracted inner faces whereby the locking pieces are prevented from dropping out when the drill is removed, and means for imparting longitudinal movement to the drill within the spindle, substantially as described.

2. In combination with the spindle having recesses, the fluked drill, the removable locking pieces seated in said recesses, and engaging the flukes of the drill, and the band encircling the spindle and holding the locking pieces in place, and means for moving the drill longitudinally within the spindle, substantially as described.

In testimony whereof I affix my signature in presence of two witnesses.

LOUIS J. CRECELIUS.

Witnesses:
    J. G. WYCOFF,
    C. D. GREENE, Jr.